US012780197B2

(12) United States Patent
Bekker

(10) Patent No.: US 12,780,197 B2
(45) Date of Patent: Nov. 3, 2026

(54) METHOD FOR ADAPTIVELY CONTROLLING THE SPEED OF A MOTOR VEHICLE USING AN ADAPTIVE CRUISE CONTROL SYSTEM, AND ADAPTIVE CRUISE CONTROL SYSTEM

(71) Applicant: KNORR-BREMSE Systeme für Nutzfahrzeuge GmbH, Munich (DE)

(72) Inventor: Ádám Bekker, Munich (DE)

(73) Assignee: KNORR-BREMSE Systeme für Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 18/965,169

(22) Filed: Dec. 2, 2024

(65) Prior Publication Data

US 2025/0178605 A1 Jun. 5, 2025

(30) Foreign Application Priority Data

Dec. 5, 2023 (EP) .................................... 23214352

(51) Int. Cl.
*B60W 30/16* (2020.01)

(52) U.S. Cl.
CPC ......... *B60W 30/16* (2013.01); *B60W 2520/10* (2013.01); *B60W 2520/125* (2013.01); *B60W 2554/4041* (2020.02); *B60W 2554/4042* (2020.02); *B60W 2554/802* (2020.02); *B60W 2720/10* (2013.01); *B60W 2720/106* (2013.01)

(58) Field of Classification Search
CPC ............. B60W 30/16; B60W 2520/10; B60W 2520/125; B60W 2554/4041; B60W 2554/4042; B60W 2554/802; B60W 2720/10; B60W 2720/106; B60W 30/18145; B60W 2552/30; B60W 30/143; B60W 30/146; B60W 40/105
See application file for complete search history.

(56) References Cited

U.S. PATENT DOCUMENTS 6,968,266 B2 * 11/2005 Ahmed-Zaid ...... B60K 31/0008 340/901
2019/0351903 A1 * 11/2019 Zhao .................. B60W 30/182

FOREIGN PATENT DOCUMENTS

DE 102005032182 A1 1/2007

* cited by examiner

*Primary Examiner* — Michael V Kerrigan
(74) *Attorney, Agent, or Firm* — Greenberg Traurig, LLP; Ryan D. Sharp

(57) ABSTRACT

A method for adaptive control of the speed of a motor vehicle with the aid of an adaptive cruise control system, in which a target speed is set for the motor vehicle, and the distance and the relative speed with respect to an object travelling ahead of the motor vehicle are detected with at least one sensor, and the speed in the motor vehicle to be controlled is set in accordance with the object speed of the object if the object speed is less than the target speed, and a lateral acceleration of the motor vehicle is detected, and an automatic acceleration of the motor vehicle to be controlled particularly to the target speed is prevented in the case of a detection loss of the object.

11 Claims, 5 Drawing Sheets

Figure 1:
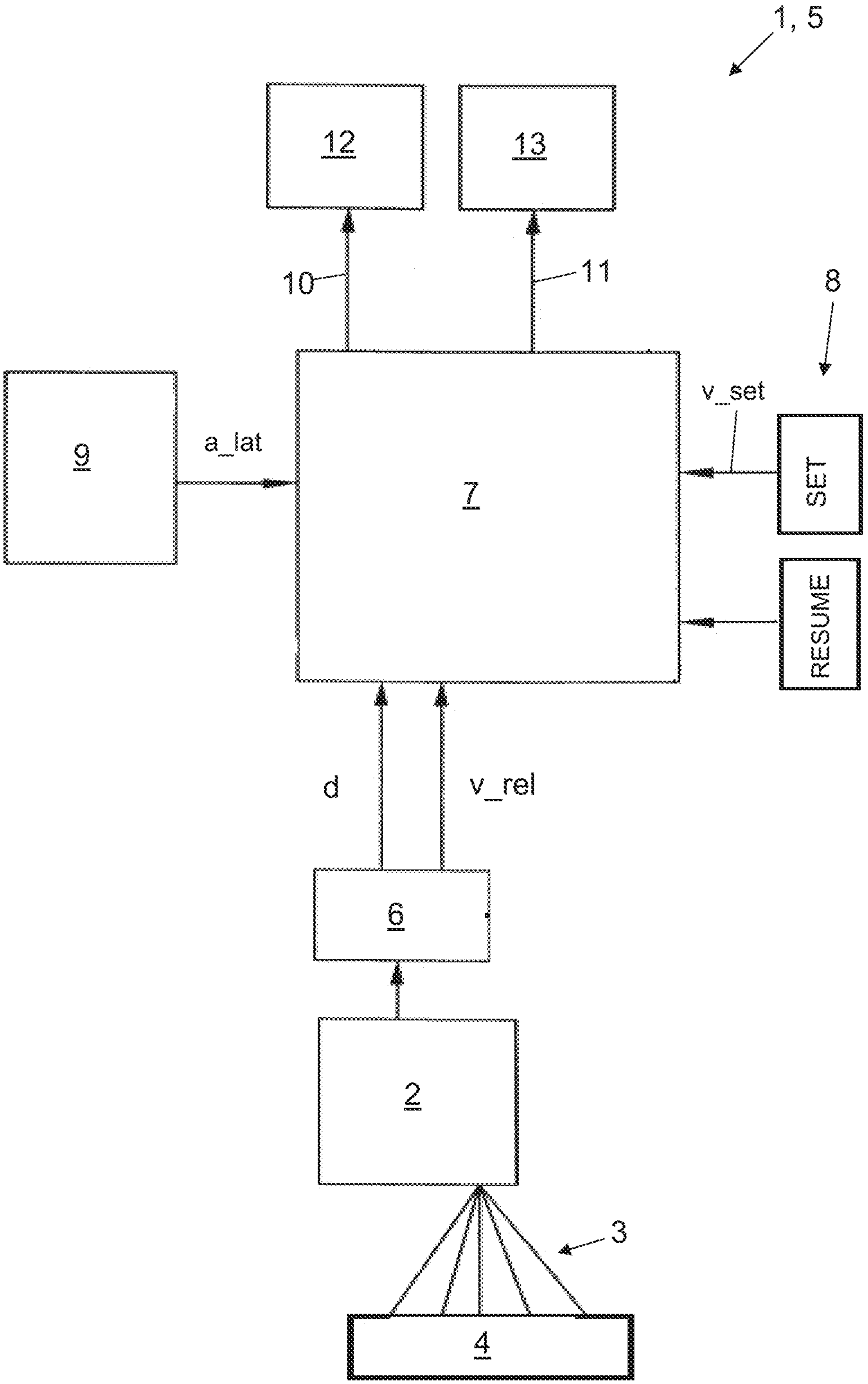

METHOD FOR ADAPTIVELY CONTROLLING THE SPEED OF A MOTOR VEHICLE USING AN ADAPTIVE CRUISE CONTROL SYSTEM, AND ADAPTIVE CRUISE CONTROL SYSTEM

CROSS-REFERENCE TO RELATED APPLICATIONS

This application claims priority to European Patent Application No. 23214352.9, filed Dec. 5, 2023, the disclosure of which is incorporated by reference herein in its entirety.

The invention proceeds from a method for adaptively controlling the speed of a motor vehicle with the aid of an adaptive cruise control system according to the preamble of claim 1, from an adaptive cruise control system of a motor vehicle according to the preamble of claim 6, and from a motor vehicle with such an adaptive cruise control system according to claim 11.

Known adaptive cruise control systems (ACC) have a distance sensor for detecting distances to an object detected in front of the motor vehicle and a control system for forming a control variable for the travel speed of the motor vehicle at least as a function of a set distance to the detected object, e.g. an object traveling ahead, determined at least from the instantaneous travel speed and/or a predefined set speed, to which at least the instantaneous travel speed and the distances to the object detected in front of the motor vehicle can be fed as actual variables.

The generic DE 10 2005 032 182 A1 describes an ACC method for controlling the speed of a motor vehicle, in which a target vehicle driving ahead is detected by a sensor and the speed in the motor vehicle to be controlled is set according to the speed of the target vehicle. In the known method, automatic acceleration of the motor vehicle to be controlled is prevented for a certain abort time in the event of a loss of detection of the object, the abort time being determined as a function of a lateral acceleration of the motor vehicle to be controlled, a non-zero abort time being defined even if the detected lateral acceleration is zero.

This increases safety against the motor vehicle colliding with the target vehicle, particularly in situations in which there is a loss of detection of the target vehicle because the target vehicle moves outside the detection range of the sensor as a result of driving along a tight curve, but the target vehicle continues to drive in front of the motor vehicle at the set distance. Without the prevention of automatic acceleration of the motor vehicle to be controlled, there would be a risk that the motor vehicle would hit the target vehicle.

The invention is based on the object to provide a method for adaptive control of the speed of a motor vehicle with the aid of an adaptive cruise control system as well as an adaptive cruise control system which avoids unnecessary limitation of the speed of the motor vehicle. Further, to also provide a motor vehicle having such an adaptive cruise control system.

This object is solved by the features of claims 1, 6 and 11.

DISCLOSURE OF THE INVENTION

According to a first aspect, the invention proceeds from a method for adaptively controlling the speed of a motor vehicle using an adaptive cruise control system (ACC), in which method a) a target speed (v_set; v_set_curve) is defined or set for the motor vehicle, and b) with at least one sensor at least the distance (d) and the relative speed (v_rel) with respect to an object (object) travelling ahead of the motor vehicle is detected, and c) the speed (v_ego) in the motor vehicle to be controlled is set according to the object speed (v_object) of the object (object) if the object speed (v_object) is smaller or lower than the target speed (v_set; v_set_curve), d) a lateral acceleration (a_lat) of the motor vehicle is detected, and e) automatic acceleration of the motor vehicle to be controlled, in particular to the target speed (v_set; v_set_curve), is prevented in the event of a loss of detection of the object (object), in particular during cornering of the motor vehicle.

The loss of detection of the object is preferably actively detected, for example by an absence of detection signals from the at least one sensor of the adaptive cruise control system or by a delivery of implausible detection signals by the at least one sensor. Such a sensor may be, for example, a radar sensor or a lidar sensor.

As already explained above, this can increase safety against the motor vehicle driving up the object, e.g. a motor vehicle driving ahead, in particular in situations in which there is a loss of detection of the object because the object moves outside the detection range of the distance sensor, e.g. as a result of cornering along a tight curve, but the object is still in front of the motor vehicle or is driving ahead of it. Without the prevention of automatic acceleration of the motor vehicle to be controlled, in particular to the target speed after the loss of detection of the object, there would therefore be a risk that the motor vehicle would hit or drive up the object.

The target speed (v_set) of the motor vehicle can be set by pressing a SET button of an operating device of the adaptive cruise control system and is then set to the speed currently being driven by the motor vehicle or to a maximum speed permitted for the route currently being driven.

It can also be provided that the target speed (v_set) of the motor vehicle is set or fixed to a lateral-acceleration-dependent target speed (v_set_curve), which can result in a safety gain during cornering. This lateral-acceleration-dependent target speed (v_set_curve) of the motor vehicle preferably has priority over the set speed (v_set) set by actuating the SET button or over the object speed (v_object) of the object in the subsequent operation of the motor vehicle, so that, in particular during cornering, situations can arise in which the lateral-acceleration-dependent target speed (v_set_curve) to which the motor vehicle is then set is smaller than the object speed (v_object) of the object, so that the object is "lost" over time. Alternatively, the lateral acceleration-dependent target speed (v_set_curve) can also be equal to or greater in relation to the object speed (v_object) of the object, so that the speed of the motor vehicle must then be reduced during cornering as part of ACC control when following the object.

The lateral-acceleration-dependent target speed (v_set_curve) can also be greater than the target speed (v_set) set by the SET button. In this case, it can be provided that the lower target speed (v_set) set by the SET button has priority over the higher lateral-acceleration-dependent target speed (v_set_curve) as well as the reverse case that the higher lateral-acceleration-dependent target speed (v_set_curve) has priority over the lower target speed (v_set) set by the SET button or key.

According to the first aspect, the invention proposes that f) the automatic acceleration of the motor vehicle to be controlled, in particular to the target speed (v_set) or to the lateral-acceleration-dependent target speed (v_set_ curve) in the case of the detection loss of the object (object) is prevented only in the case of those rides or journeys, in particular only in the case of those cornering rides or journeys, in which the detected lateral acceleration (a_lat) of the motor vehicle corresponds to a non-zero lateral acceleration limit (a_lat_limit) or exceeds this lateral acceleration limit (a_lat_limit).

In other words, in the method, the motor vehicle is automatically held at the object speed (v_object) or the lateral-acceleration-dependent target speed (v_set_curve), whichever is lower, in particular when cornering, and is prevented from accelerating to the set target speed (v_set; v_set_curve) if the detected lateral acceleration (a_lat) of the motor vehicle corresponds to a non-zero lateral acceleration limit (a_lat_limit) or exceeds this lateral acceleration limit (a_lat_limit).

Otherwise, i.e. if the detected lateral acceleration (a_lat) of the motor vehicle is less than the lateral acceleration limit (a_lat_limit), this prevention does not take place and the ACC control modified by the invention accelerates the motor vehicle to the respective set or valid target speed (v_set or v_set_curve).

For example, the lateral acceleration limit (a_lat_limit) is greater than or equal to 0.5 g ($m/s^2$), preferably greater than or equal to 1.0 g $(m/s)^2$.

On the one hand, this measure has the effect that in particular only the signal of at least one lateral acceleration sensor that is already present in modern motor vehicles, e.g. as part of a driving dynamics control system, is used to make a decision as to whether or not automatic acceleration of the motor vehicle to be controlled is prevented when driving with loss of detection of the object. This advantageously reduces the amount of sensor technology required.

The invention further recognized that high lateral accelerations of the motor vehicle are more likely to occur on tight curves with small radii of curvature, and low lateral accelerations are more likely to occur on wide curves with large radii of curvature. Consequently, the likelihood of loss of detection of the target vehicle is greater at high lateral accelerations than at low lateral accelerations.

Against the background that the detection loss of the object (target vehicle) cannot always be determined with sufficient certainty, the invention makes use of the above-described relationship and prevents the automatic acceleration of the motor vehicle to be controlled to the target speed (v_set or v_set_curve) only if there is a relatively high lateral acceleration (a_lat>=a_lat_limit), which then suggests a rather tight curve and confirms the detected detection loss. On the one hand, this increases the certainty of the detection loss of the object.

On the other hand, in situations where the detected lateral acceleration is relatively low (a_lat<a_lat_limit), which suggests a rather wide curve and makes the detected detection loss seem rather unlikely, the acceleration of the motor vehicle to the target speed (v_set or v_set_curve) is prevented in an unnecessary way.

Advantageous further embodiments of the invention are possible in the subclaims.

Preferably, in the method, the automatic acceleration of the motor vehicle to be controlled to the target speed (v_set or v_set_curve) is prevented, in particular, only within a holding period (t_hold), which begins with the loss time (t_lost) of the detection loss of the object (object) and ends at an end time (t_end) which a) corresponds to a first end time point (t_end1), in which the lateral acceleration (a_lat) of the motor vehicle has fallen below the lateral acceleration limit (a_lat_limit), or which b) corresponds to a second end time point (t_end2), which is the sum of the first end time point (t_end1) and a predetermined or parameterizable time interval (At).

In other words, in the method, in particular only within the hold period (t_hold), the motor vehicle is automatically held at the object speed (v_object) or at the lateral-acceleration-dependent target speed (v_set_curve), whichever is lower, and prevented from accelerating to the target speed (v_set).

The first end time point (t_end1), at which the lateral acceleration (a_lat) of the motor vehicle has fallen below the lateral acceleration limit (a_lat_limit), marks a point in time at which, due to the low lateral acceleration, it can be assumed that the curve is widening again (larger curve radius) and therefore the object traveling ahead can again enter the detection range of the distance sensor, or it can be assumed that the object in front has accelerated so strongly in the curve that it has therefore moved out of the detection range of the distance sensor and that acceleration of the motor vehicle to the target speed (v_set) is possible without danger at the relatively low lateral acceleration present.

The second end time (t_end2) is later than the first end time (t_end1) because a specified or parameterizable time interval (At) is added to the first end time (t_end1) as a safety period.

It is also possible in the method to additionally check whether or not the object has been lost. Then, in the method, the motor vehicle is automatically held at the object speed (v_object), in particular only within the holding period (t_hold), and is prevented from accelerating to the target speed (v_set or v_set_curve), for example, if the detected lateral acceleration (a_lat) of the motor vehicle corresponds to the non-zero lateral acceleration limit (a_lat_limit) or exceeds this lateral acceleration limit (a_lat_limit) and if a loss of the object has been particularly actively detected.

According to a further development of the method, it is provided that the prevention of automatic acceleration of the motor vehicle to the target speed (v_set or v_set_curve) is cancelled if within the holding period (t_hold) a resume actuator, in particular a RESUME button of the adaptive cruise control system (ACC), is actuated, the actuation of which is intended to cause the motor vehicle to resume the last set target speed (v_set or v_set_curve). This allows the driver to override the prevention of acceleration of the motor vehicle within the hold period (t_hold) by actuating the resume actuator, which causes the motor vehicle to accelerate again to the target speed (v_set or v_set_curve) immediately after actuation.

Alternatively, the method can preferably provide that the prevention of automatic acceleration of the motor vehicle to the target speed (v_set or v_set_curve) is continued at least until the end time (t_end) of the holding period (t_hold), even if the resume actuator (RESUME) of the adaptive cruise control system is actuated within the holding period (t_hold), in particular the RESUME button, the actuation of which is intended to cause the motor vehicle to resume the last target speed (v_set or v_set_curve). Thus, no overriding of the prevention of acceleration by an actuation of the resume actuator (RESUME) can take place within the hold period (t_hold).

Also, the target speed (v_set; v_set_curve) can be specified in the procedure, depending on a) an actuation of a set speed actuator (SET) of the adaptive cruise control system (ACC), and/or depending on b) the recorded lateral acceleration (a_lat) of the motor vehicle.

If the target speed is set automatically depending on the detected lateral acceleration (a_lat) of the motor vehicle, which then corresponds to the lateral-acceleration dependent target speed (v_set_curve) mentioned above, for example, it is set lower the higher the detected lateral acceleration (a_lat) is and higher the lower the detected lateral acceleration (a_lat) is for safety reasons.

For a lateral acceleration which is substantially equal to zero, the lateral-acceleration-dependent target speed (v_set_curve) may in particular correspond to a set speed (v_set) which is determined by actuation of the set or target speed actuator (SET). Also, the lateral acceleration-dependent target speed (v_set_curve) can be larger or smaller than the set speed (v_set) determined by the actuation of the set or target speed actuator (SET).

According to a second aspect, the invention proceeds from an adaptive cruise control (ACC) system of a motor vehicle comprising:

a) means to set a target speed (v_set; v_set_curve) for the motor vehicle, b) at least one sensor which is designed and set up to detect at least the distance (d) and the relative speed (v_rel) with respect to an object (object) traveling ahead of the motor vehicle and to generate corresponding sensor signals, c) a controller which is designed and set up to adjust the speed (v_ego) in the motor vehicle to be controlled in accordance with the object speed (v_object) of the object (object) as a function of the sensor signals if the distance (d) is smaller than a target distance (d_target), d) at least one lateral acceleration sensor is provided, designed and set up to detect the lateral acceleration (a_lat) of the motor vehicle, and in that e) the controller is designed and configured to prevent automatic acceleration of the motor vehicle to be controlled, in particular to the target speed (v_set; v_set_curve), in the event of a loss of detection of the object particularly during cornering.

The means to set the target speed (v_set) for the motor vehicle preferably comprise the SET key or button of the operating device already mentioned above and/or logic implemented in the controller, by means of which the lateral-acceleration depending target speed (v_set_curve) is dependent on lateral acceleration and is therefore set as a function of the lateral acceleration (a_lat) measured by the lateral acceleration sensor.

The invention then proposes, according to the second aspect, that f) the controller is designed and set up to prevent the automatic acceleration of the motor vehicle to be controlled, in particular to the target speed (v_set or v_set_curve) in the event of the detection loss of the object, only during those journeys or rides in which the detected lateral acceleration (a_lat) of the motor vehicle corresponds to a non-zero lateral acceleration limit (a_lat_limit) or exceeds this lateral acceleration limit (a_lat_limit).

Advantages and preferred further embodiments of the measures according to the invention are already described above with respect to the first aspect of the invention.

According to a preferred design of the adaptive cruise control system, it is provided that the controller is designed and arranged to prevent the automatic acceleration of the motor vehicle to be controlled, in particular, to the target speed (v_set or v_set_curve), in particular, only within a holding period (t_hold) which starts with the loss time (t_lost) of the detection loss of the object (object) and ends at an end time (t_end) which a) corresponds to a first end time point (t_end1) in which the lateral acceleration (a_lat) of the motor vehicle has fallen below the lateral acceleration limit (a_lat_limit), or which b) corresponds to a second end time point (t_end2), which is the sum of the first end time point (t_end1) and a predetermined or parameterizable time interval (At).

According to a further development of the adaptive cruise control system, it may be provided that it comprises a resumption actuator (RESUME), the actuation of which is intended to cause the motor vehicle to resume the last set target speed (v_set; v_set_curve).

In this context, the control system can be designed and set up a) to cancel the prevention of the automatic acceleration of the motor vehicle, in particular to the target speed (v_set or v_set_curve), if the resume actuator (RESUME) is actuated within the hold period (t_hold), or in order to b) to continue the prevention of the automatic acceleration of the motor vehicle, in particular to the target speed (v_set or v_set_curve), at least until the end time (t_end) of the holding period (t_hold), even if the resume actuator (RESUME) is actuated within the holding period (t_hold).

The adaptive cruise control system can also be designed to have a setpoint or target speed actuator (SET) and the controller is designed and configured to set the target speed (v_set) depending on an actuation of the target speed actuator (SET).

Particularly preferably, the adaptive cruise control system can also be designed and set up to set the lateral-acceleration-depending target speed (v_set_curve) as a function of the detected lateral acceleration (a_lat) of the motor vehicle, in particular during cornering of the motor vehicle.

The invention also includes a motor vehicle having an adaptive cruise control (ACC) system described above.

DRAWING

Figure 2:
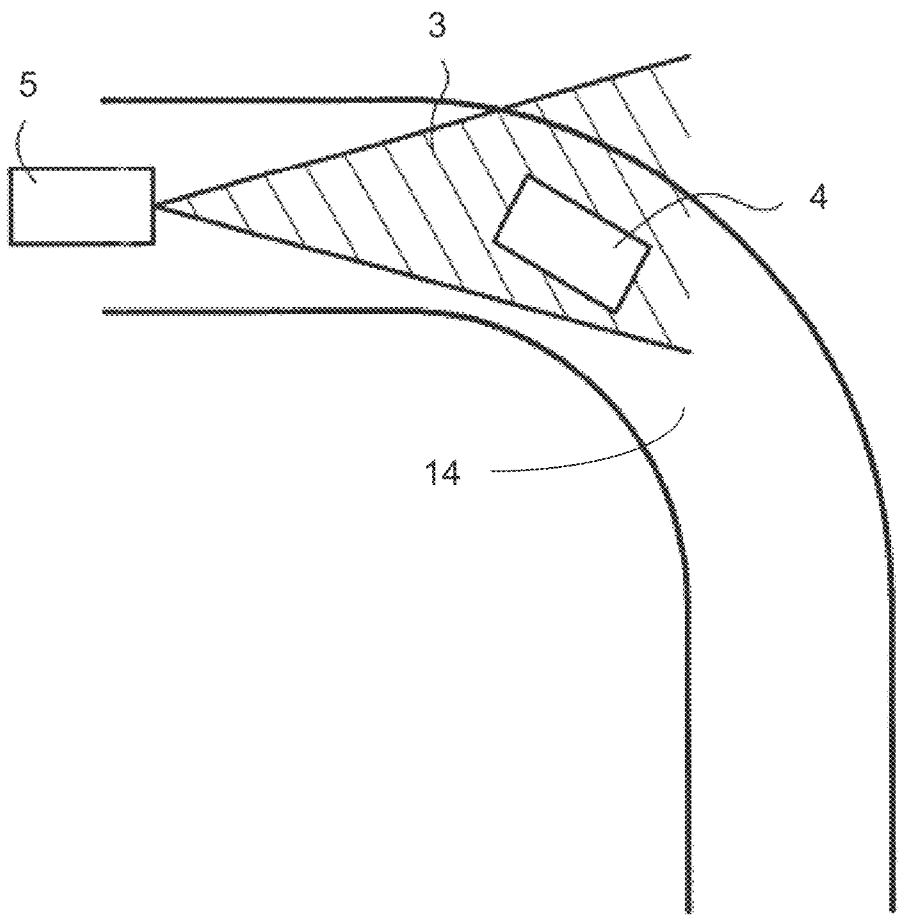
Figure 3:
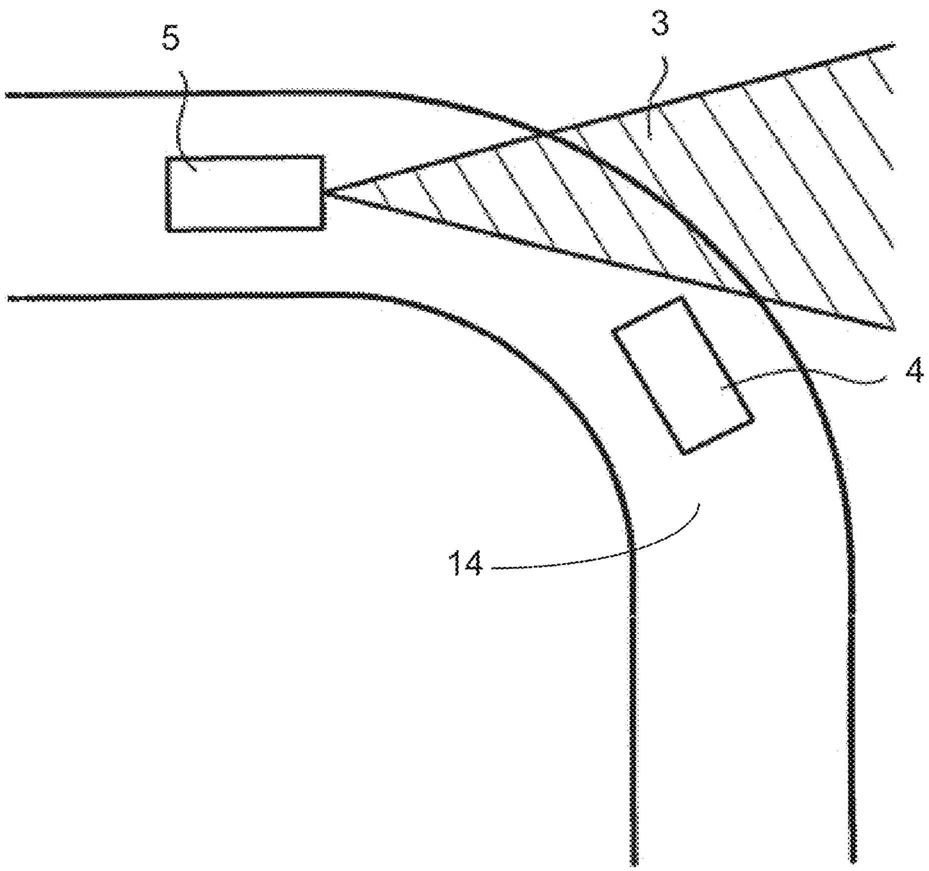
Figure 4:
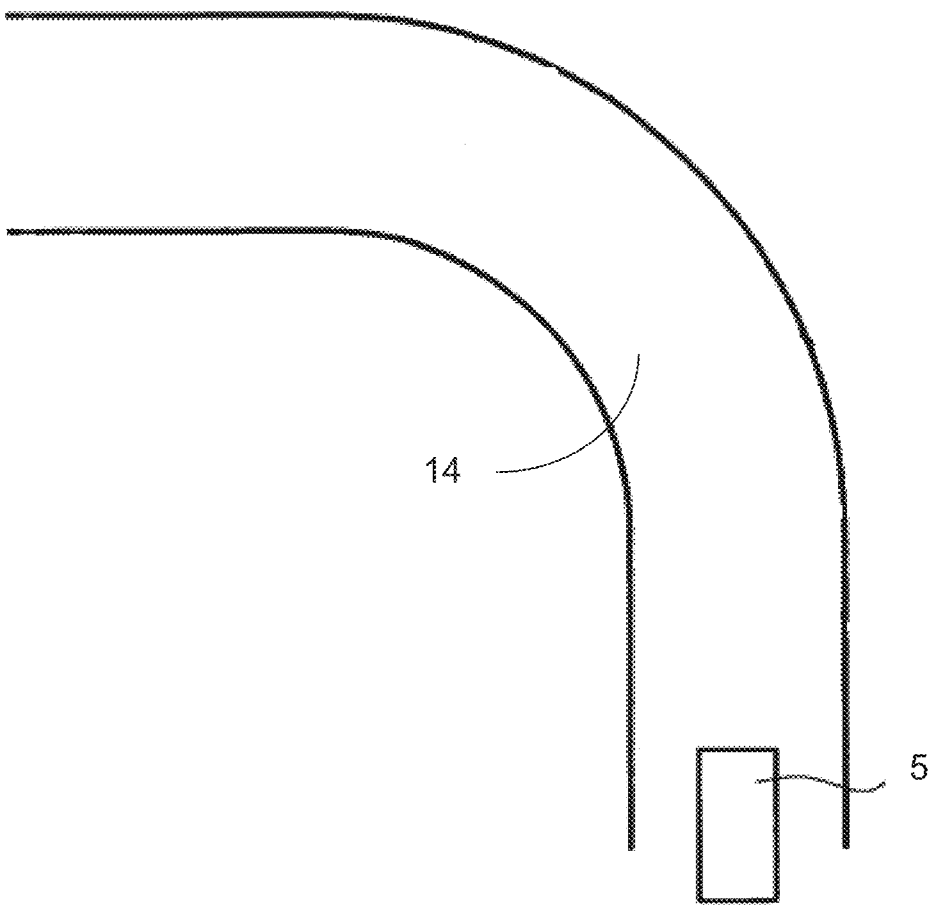
Figure 5:
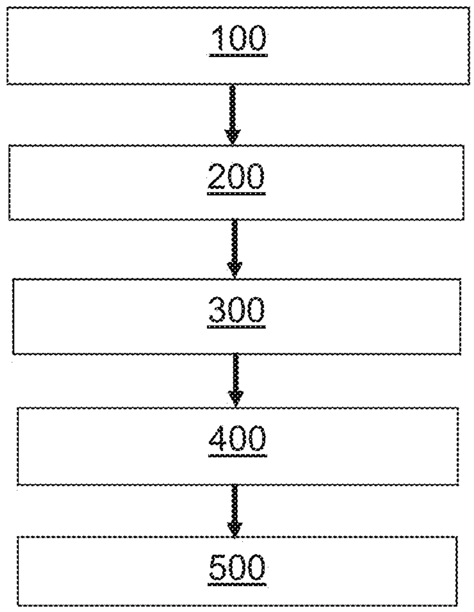

An embodiment of the invention is shown below in the drawing and explained in more detail in the following description. The drawing shows FIG. 1 a block diagram of an adaptive cruise control system of a vehicle according to a preferred embodiment;

FIG. 2 a first phase of a cornering maneuver of the motor vehicle, in which a motor vehicle in front is detected by a distance sensor of the adaptive cruise control system;

FIG. 3 a second phase of cornering of the motor vehicle, in which the motor vehicle driving ahead is no longer detected or can no longer be detected by the distance sensor of the adaptive cruise control system;

FIG. 4 a third phase of cornering of the motor vehicle, in which it exits the curve;

FIG. 5 a flow diagram of a method for adaptive control of the speed of a motor vehicle using the adaptive cruise control system of FIG. 1.

DESCRIPTION OF THE EMBODIMENT

An adaptive cruise control device 1 integrated in a motor vehicle 5, the block diagram of which is shown in FIG. 1, has a distance sensor 2, for example a radar sensor, the output signals of which comprise data relating to the distance d and the relative speed v_rel with respect to an object 4 located in a detection area 3 of the distance sensor 2, in this case, for example, with respect to a target motor vehicle driving in front of the motor vehicle 5. The distance data and the relative velocity data of the distance sensor 2 are supplied to a processing device 6 for processing. The processing device 6 passes the distance data and the relative velocity data of the object 4 to a control device 7, here for example in the form of control electronics. In addition to the distance data and the relative velocity data, the control device 7 is fed a target speed v_set specified by the driver via a SET button on an operating device 8. There is also a lateral acceleration sensor 9 which detects the lateral acceleration a_lat of the motor vehicle 5 and feeds corresponding lateral acceleration data to the control unit 7.

At least depending on the distance data, the relative speed data and the lateral acceleration data, the control device 7 then controls manipulated variables 10 and 11 into a braking device 12 and into a driving machine 13 for controlling the speed v of the motor vehicle and the distance d to the object 4 in order to adjust the target distance d_target to the detected object 4 calculated on the basis of these data. If the target speed v_set here for example specified by the driver is greater than the object speed v_object of the object 4, the speed v_ego of the motor vehicle 5 is adjusted accordingly.

If the ACC control described is overridden by driver intervention, the last set or preset target speed v_set can be reset or reactivated by pressing a RESUME button or key on the operating device 8. Accordingly, the RESUME button interacts with the control device 7.

Software is implemented in the control device 7, which embodies a method for adaptively controlling the speed of the motor vehicle using the modified adaptive cruise control (ACC) system, a preferred embodiment of which is described below.

In the method shown in FIG. 5, the target speed v_set for the motor vehicle is set in a step 100, here for example, by pressing the SET button. Now assume that the motor vehicle 5 initially travels on a straight road and the distance sensor 2 detects a vehicle traveling ahead as an object 4 in a step 200, whose object speed v_object is less than the target speed v_set. Then, in a step 300, the control device 7 controls the manipulated variables 10, 11 in the braking device 12 and/or in the prime mover 13 in such a way that the motor vehicle 5 drives behind the vehicle 4 in front at the calculated target distance d_target with the object speed v_object, which is smaller here than the target speed v_set, which corresponds to a known HOLD MODE of the ACC control.

If the vehicle in front 4 and the motor vehicle 5 then enter a curve 14 together and the motor vehicle 5 in front continues to be in the detection range 3 of the distance sensor 2, which is shown in FIG. 2, then the ACC control described above for the straight section is also generally continued when driving through the curve 14, with both motor vehicles then driving through the curve 14, for example, in each case at the object speed v_object of the vehicle 4 in front.

In the case of the motor vehicle 5, the control device 7 can optionally additionally provide, for example, a reduction of the target speed v_set to a lateral-acceleration-dependent target speed v_set_curve depending on the lateral acceleration a_lat measured by the lateral acceleration sensor 9. In this case, the lateral-acceleration-dependent target speed v_set_curve is preferably lower here than the target speed v_set which has been set as described above for the straight travel of the motor vehicle 5, for example, by actuating the SET button. However, since the lateral-acceleration-dependent target speed v_set_curve is greater than the object speed v_object of the vehicle 4 in front, the speed of the motor vehicle 5 in the curve 14 is reduced to the object speed v_object of the vehicle 4 in front, for example, by the ACC control implemented in the control device 7.

If, during further cornering along the curve 14, the situation of FIG. 3 can occur, in which the preceding vehicle 4 moves out of the detection range 3 of the distance sensor 2 of the motor vehicle 5 at a loss time t_lost, either because the curve radius of the curve 14 is reduced or because the preceding motor vehicle 4 has accelerated out of the curve 14, then in a step 400 of the method, an automatic acceleration of the motor vehicle 5, which is actually then to be produced by the control device 7, from the object speed v_object of the preceding motor vehicle 4 to the target speed v_set of straight-ahead travel, or to the lower lateral-acceleration-dependent target speed v_set_curve.

This prevention in step 400 is only performed if the detected lateral acceleration a_lat of the motor vehicle 5 corresponds to a non-zero lateral acceleration limit a_lat_limit or if the detected lateral acceleration a_lat exceeds the lateral acceleration limit a_lat_limit, which should be the case in the situation of FIG. 3, for example. Otherwise, this prevention does not take place. The lateral acceleration limit a_lat_limit represents, for example, a fixed value or a parameterizable value. The lateral acceleration limit a_lat_limit is, for example, greater than or equal to 0.5 g ($m/s^2$), preferably greater than or equal to 0.5 g ($m/s^2$).

Preferably, in the method in the step 400, the automatic acceleration of the motor vehicle 5 to be controlled, which is actually to be established, is prevented only within a holding period t_hold, which starts at the loss time t_lost of the detection loss of the preceding vehicle 4 and ends at an end time t_end.

This end time t_end can correspond to a first end time t_end1 in which the lateral acceleration a_lat of the motor vehicle 5 has fallen below the lateral acceleration limit a_lat_limit. This situation is shown, for example, in FIG. 4, in which the motor vehicle 5 is already at the exit of the curve 14, at which the curve radius has widened again and therefore the lateral acceleration a_lat of the motor vehicle 5 has reduced again to below the lateral acceleration limit a_lat_limit.

The first end time t_end1, at which the lateral acceleration a_lat of the motor vehicle 5 has fallen below the lateral acceleration limit a_lat_limit, marks a time at which it can be assumed, due to the low lateral acceleration a_lat, that the curve 14 is widening again (larger curve radius) or has come to an end and therefore the vehicle in front 4 could also come back into the detection range 3 of the distance sensor 2. Alternatively, it can also be assumed that the vehicle 4 in front has accelerated so strongly in curve 14 that it has moved out of the detection range 3 of the distance sensor 2 for this reason. In this case, with the relatively low lateral acceleration a_lat, acceleration of the motor vehicle 5 to the original target speed v_set or v_set_curve is possible without risk.

Alternatively, the end time t_end can also correspond to a second end time t_end2, which is the sum of the first end time t_end1 and a specified or parameterizable time interval Δt. The second end time t_end2 is therefore later in time than the first end time t_end1 because a specified or parameterizable time interval Δt is added to the first end time t_end1 as a safety time interval.

According to a further development, it is provided in an optional step 500 of the method that the prevention of the automatic acceleration of the motor vehicle 5 to the target speed v_set or v_set_curve is cancelled if, within the holding period t_hold, the RESUME button of the adaptive cruise control device 1 is actuated, the actuation of which is intended to cause the motor vehicle 5 to resume the last target speed v_set or v_set_curve. This allows the driver to override the prevention of acceleration of the motor vehicle 5 by an actuation of the RESUME button, whereby the motor vehicle 5 is accelerated again to the target speed v_set or to the lateral-acceleration-dependent target speed v_set-curve almost immediately after actuation of the RESUME button.

Alternatively, in the optional step 500 of the method, it can also be provided that the prevention of the automatic acceleration of the motor vehicle 5 to the target speed v_set or to the lateral-acceleration-dependent target speed v_set-curve is continued at least until the end time t_end of the holding period t_hold, even if the RESUME button is pressed by the driver within the holding period t_hold. This means that the prevention of acceleration cannot be overwritten by pressing the RESUME button within the holding period t_hold.

The software implemented in the control device 7 can therefore be designed to implement both alternatives described above.

LIST OF REFERENCE SIGNS

1 adaptive cruise control device
2 distance sensor
3 detection range
4 object, vehicle ahead
5 motor vehicle
6 processing device
7 control device
8 operating device (HMI)
9 lateral acceleration sensor
10 control variable
11 control variable
12 braking device
13 driving machine
14 curve
d distance
d_target target distance
v_object object speed
v_ego speed of the motor vehicle
v_rel relative velocity
v_set target or set speed
v_set_curve lateral-acceleration-dependent target speed
a_lat lateral acceleration
a_lat_limit lateral acceleration limit
t_hold hold period
t_lost loss time
t_end end time
t_end1 first end time
t_end2 second end time
Δt time interval
RESUME RESUME button
SET SET button

The invention claimed is:

1. A method for adaptive control of a speed of a motor vehicle with an aid of an adaptive cruise control system, the method comprising:

a) setting a target speed (v_set; v_set_curve) for the motor vehicle, b) detecting, with at least one sensor, at least a distance (d) and a relative speed (v_rel) with respect to an object driving ahead of the motor vehicle, c) setting the speed (v_ego) in the motor vehicle to be controlled according to an object speed (v_object) of the object if the object speed (v_object) is smaller than the target speed (v_set; v_set_curve), d) detecting a lateral acceleration (a_lat) of the motor vehicle, and e) setting the target speed (v_set) of the motor vehicle to a lateral-acceleration-dependent target speed (v_set_curve), which has priority over the set target speed (v_set) set by actuating a SET button of the adaptive cruise control system or over the object speed (v_object), f) preventing an automatic acceleration of the motor vehicle to be controlled particularly to the target speed (v_set; v_set_curve) in event of a loss of detection of the object, g) wherein the automatic acceleration of the motor vehicle to be controlled particularly to the target speed (v_set; v_set_curve) is prevented in case of the detection loss of the object only for those journeys or rides in which the detected lateral acceleration (a_lat) of the motor vehicle corresponds to a non-zero lateral acceleration limit (a_lat_limit) or exceeds this lateral acceleration limit (a_lat_limit).

2. The method according to claim 1, the automatic acceleration of the motor vehicle to be controlled particularly to the target speed (v_set; v_set_curve) is prevented, in particular, only within a hold period (t_hold), which starts with a loss time (t_lost) of the detection loss of the object and ends at an end time (t_end) which;

a) corresponds to a first end time point (t_end1) at which the lateral acceleration (a_lat) of the motor vehicle has fallen below the lateral acceleration limit (a_lat_limit), or which;

b) corresponds to a second end time point (t_end2), which is a sum of the first end time point (t_end1) and a predetermined or parameterizable time interval (Δt).

3. The method according to claim 2, wherein the prevention of the automatic acceleration of the motor vehicle particularly to the target speed (v_set; v_set_curve) is cancelled if, within the hold period (t_hold), a resume actuator (RESUME) of the adaptive cruise control system is actuated, the actuation of which is intended to cause the motor vehicle to resume a last set target speed (v_set; v_set_curve).

4. The method according to claim 2, wherein the prevention of automatic acceleration of the motor vehicle particularly to the target speed (v_set; v_set_curve) is continued at least until the end time (t_end) of the holding period (t_hold), even if a resumption actuator (RESUME) of the adaptive cruise control system is actuated within the holding period (t_hold), the actuation of which actuator is intended to bring about a resumption of a most recently determined set speed (v_set; v_set_curve) by the motor vehicle.

5. The method according to claim 1 wherein the target speed (v_set; v_set_curve) is determined depending on:

a) an actuation of a set speed actuator (SET) of the adaptive cruise control system, and/or depending on:

b) the detected lateral acceleration (a_lat) of the motor vehicle.

6. An adaptive cruise control system of a motor vehicle, comprising:

a) means for setting a target speed (v_set; v_set_curve) for the motor vehicle, b) at least one sensor which is configured to detect at least a distance (d) and a relative speed (v_rel) with respect to an object traveling ahead of the motor vehicle and to generate corresponding sensor signals, c) a controller which is configured to adjust the speed (v_ego) in the motor vehicle to be controlled in accordance with an object speed (v_object) of the object as a function of the sensor signals if the object speed (v_object) is less than the target speed (v_set; v_set_curve), d) at least one lateral acceleration sensor is provided, configured to detect the lateral acceleration (a_lat) of the motor vehicle, and in that e) the controller is configured to define the target speed (v_set_curve) as a function of the detected lateral acceleration (a_lat) of the motor vehicle, which has priority over the set speed (v_set) set by actuating a SET button of the adaptive cruise control system or over the object speed (v_object), and in that f) the controller is configured to prevent automatic acceleration of the motor vehicle to be controlled particularly to the target speed (v_set; v_set_curve) in event of a loss of detection of the object, wherein g) the controller is configured to prevent the automatic acceleration of the motor vehicle to be controlled particularly to the target speed (v_set; v_set_curve) in the event of the detection loss of the object only for those journeys or rides in which the detected lateral acceleration (a_lat) of the motor vehicle corresponds to a non-zero lateral acceleration limit (a_lat_limit) or exceeds this lateral acceleration limit (a_lat_limit).

7. The adaptive cruise control system according to claim 6, wherein the controller is configured to prevent the automatic acceleration of the motor vehicle to be controlled particularly to the target speed (v_set; v_set_curve) only within a hold period (t_hold) which starts with a loss time point (t_lost) of the detection loss of the object and ends at an end time point (t_end) which:

a) corresponds to a first end time point (t_end1) at which the lateral acceleration (a_lat) of the motor vehicle has fallen below the lateral acceleration limit (a_lat_limit), or b) corresponds to a second end time point (t_end2), which is a sum of the first end time point (t_end1) and a predetermined or parameterizable time interval (Δt).

8. The adaptive cruise control system according to claim 7, further comprising a resume actuator (RESUME), the actuation of which is intended to cause the motor vehicle to resume a last set target speed (v_set; v_set_curve).

9. The adaptive cruise control system according to claim 8, wherein the controller is further configured to:

a) cancel the prevention of automatic acceleration of the motor vehicle if the resume actuator (RESUME) is actuated within the hold period (t_hold), or b) continue the prevention of automatic acceleration of the motor vehicle at least until the end time (t_end) of the hold period (t_hold), even if the resume actuator (RESUME) is actuated within the hold period (t_hold).

10. The adaptive cruise control system according to claim 6 further comprising a target speed actuator (SET), wherein the controller is further configured to set the target speed (v_set) depending on an actuation of the target speed actuator (SET).

11. A motor vehicle with the adaptive cruise control system according to claim 6.

* * * * *